United States Patent
Brooks et al.

(10) Patent No.: US 7,099,910 B2
(45) Date of Patent: Aug. 29, 2006

(54) PARTITIONED SHIFTER FOR SINGLE INSTRUCTION STREAM MULTIPLE DATA STREAM (SIMD) OPERATIONS

(75) Inventors: Jeffrey S. Brooks, Austin, TX (US); Christopher H. Olson, Austin, TX (US); Paul J. Jagodik, Austin, TX (US)

(73) Assignee: Sun Microsystems, Inc., Palo Alto, CA (US)

( * ) Notice: Subject to any disclaimer, the term of this patent is extended or adjusted under 35 U.S.C. 154(b) by 693 days.

(21) Appl. No.: 10/408,132

(22) Filed: Apr. 7, 2003

(65) Prior Publication Data

US 2004/0199561 A1 Oct. 7, 2004

(51) Int. Cl.
*G06F 7/485* (2006.01)
(52) U.S. Cl. .................................... 708/505
(58) Field of Classification Search ............... 708/505, 708/205, 209
See application file for complete search history.

(56) References Cited

U.S. PATENT DOCUMENTS

| | | | |
|---|---|---|---|
| 5,487,022 A * | 1/1996 | Simpson et al. ............ 708/205 |
| 5,636,351 A | 6/1997 | Lee ............................. 395/380 |
| 5,673,407 A * | 9/1997 | Poland et al. ............... 712/222 |
| 5,761,103 A * | 6/1998 | Oakland et al. ............ 708/497 |
| 5,867,724 A | 2/1999 | McMahon ............. 395/800.22 |
| 6,243,728 B1 | 6/2001 | Farooqui et al. ............ 708/209 |
| 6,631,392 B1 * | 10/2003 | Jiang et al. ................. 708/498 |
| 6,714,197 B1 * | 3/2004 | Thekkath et al. ........... 345/427 |

* cited by examiner

*Primary Examiner*—D. H. Malzahn
(74) *Attorney, Agent, or Firm*—Hamilton & Terrile, LLP; Stephen A. Terrile

(57) ABSTRACT

A method of enabling a single instruction stream multiple data stream operation and a double precision floating point operation within a single floating point execution unit which includes providing a floating point unit with a two way aligner and a two way normalizer, selectively aligning a value based upon whether a single instruction stream multiple data stream operation is to be performed or a double precision operation is to be performed, and selectively normalizing a value based upon whether a single instruction stream multiple data stream operation is to be performed or a double precision operation is to be performed.

20 Claims, 6 Drawing Sheets

*Figure 3A*

| 63 | 62 52 | 51 0 |
|---|---|---|
| S | EXP | FRAC |

*Figure 3B*

| 63 | 62 55 | 54 32 | 31 | 30 23 | 22 0 |
|---|---|---|---|---|---|
| $S_H$ | $EXP_H$ | $FRAC_H$ | $S_L$ | $EXP_L$ | $FRAC_L$ |

*Figure 3C*

| 63 | 62 11 | 10 0 |
|---|---|---|
| L | FRAC | zero11 |

*Figure 3D*

| 63 | 62 40 | 39 32 | 31 | 30 8 | 7 0 |
|---|---|---|---|---|---|
| $L_H$ | $FRAC_H$ | zero8 | $L_L$ | $FRAC_L$ | zero8 |

US 7,099,910 B2

PARTITIONED SHIFTER FOR SINGLE INSTRUCTION STREAM MULTIPLE DATA STREAM (SIMD) OPERATIONS

BACKGROUND OF THE INVENTION

1. Field of the Invention

The present invention relates to processors, and more particularly to processors executing floating point instructions

2. Description of the Related Art

It is known to provide a computer architecture with a single instruction stream multiple data stream (SIMD) architecture. A SIMD architecture is a computer architecture that performs one operation on multiple sets of data, for example, an array processor. One computer or processor is used for the control logic and the remaining processors are used as slaves, each executing the same instruction.

It is known to provide a VIS Instruction Set for executing on processors. The VIS instruction set is a set of RISC instructions which are extensions to the SPARC V9 open processor architecture and are designed to accelerate applications where multiple data entries require the same instruction, such as; multimedia, image processing and networking applications. The VIS Instruction Set is SIMD code embedded in, for example, UltraSPARC processors.

The VIS 3.0 instruction set architecture defines several single precision floating point instructions which execute as a SIMD operation. These instructions produce two independent 32-bit single precision results in parallel. Each 64-bit source register for the SIMD instructions contains two 32-bit single precision floating point values.

It is known for a processor implementing the VIS 3.0 instruction set to execute a two way SIMD single precision floating point add instruction (e.g., a SFADD instruction). With such an instruction, it is desirable to provide aligner and normalizer shifters within the floating point unit to operate on two independent sets of single precision data. It is also desirable for these shifters to support a conventional double precision operation having one wider floating point value

SUMMARY OF THE INVENTION

In one embodiment, the invention relates to a method of enabling a single instruction stream multiple data stream operation and a double precision floating point operation within a single floating point execution unit which includes providing a floating point unit with a two way aligner and a two way normalizer, selectively aligning a value based upon whether a single instruction stream multiple data stream operation is to be performed or a double precision operation is to be performed, and selectively normalizing a value based upon whether a single instruction stream multiple data stream operation is to be performed or a double precision operation is to be performed.

In another embodiment, the invention relates to a floating point add unit for performing a single instruction stream multiple data stream operation and a double precision floating point operation which includes a first multiplexer, a second multiplexer, a two way aligner coupled to the first multiplexer, an adder coupled to the two way aligner and to the second multiplexer, a leading zero detector coupled to the adder, a two way normalizer coupled to the leading zero detector, a rounder coupled to the two way normalizer, and a multiplexer coupled to the two way normalizer and to the rounder. The two way aligner includes a partitioned shift multiplexer. The partitioned shift multiplexer selectively aligns a value based upon whether a single instruction stream multiple data stream operation is to be performed or a double precision operation is to be performed. The two way normalizer includes a partitioned shift multiplexer. The partitioned shift multiplexer selectively normalizes a value based upon whether a single instruction stream multiple data stream operation is to be performed or a double precision operation is to be performed In another embodiment, the invention relates to a floating point unit for performing a single instruction stream multiple data stream operation and a double precision floating point operation which includes a first multiplexer, a second multiplexer, a two way aligner coupled to the first multiplexer, a two way normalizer coupled to the leading zero detector, a rounder coupled to the two way normalizer, a multiplexer coupled to the two way normalizer and to the rounder, an adder coupled to the two way aligner and to the second multiplexer, and a leading zero detector coupled to the adder. The two way aligner includes a partitioned shift multiplexer. The partitioned shift multiplexer selectively aligns a value based upon whether a single instruction stream multiple data stream operation is to be performed or a double precision operation is to be performed. The two way normalizer includes a partitioned shift multiplexer. The partitioned shift multiplexer selectively normalizes a value based upon whether a single instruction stream multiple data stream operation is to be performed or a double precision operation is to be performed.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 3A–3D shows diagrammatic representations of architected and internal data formats.

DETAILED DESCRIPTION

Figure 1:
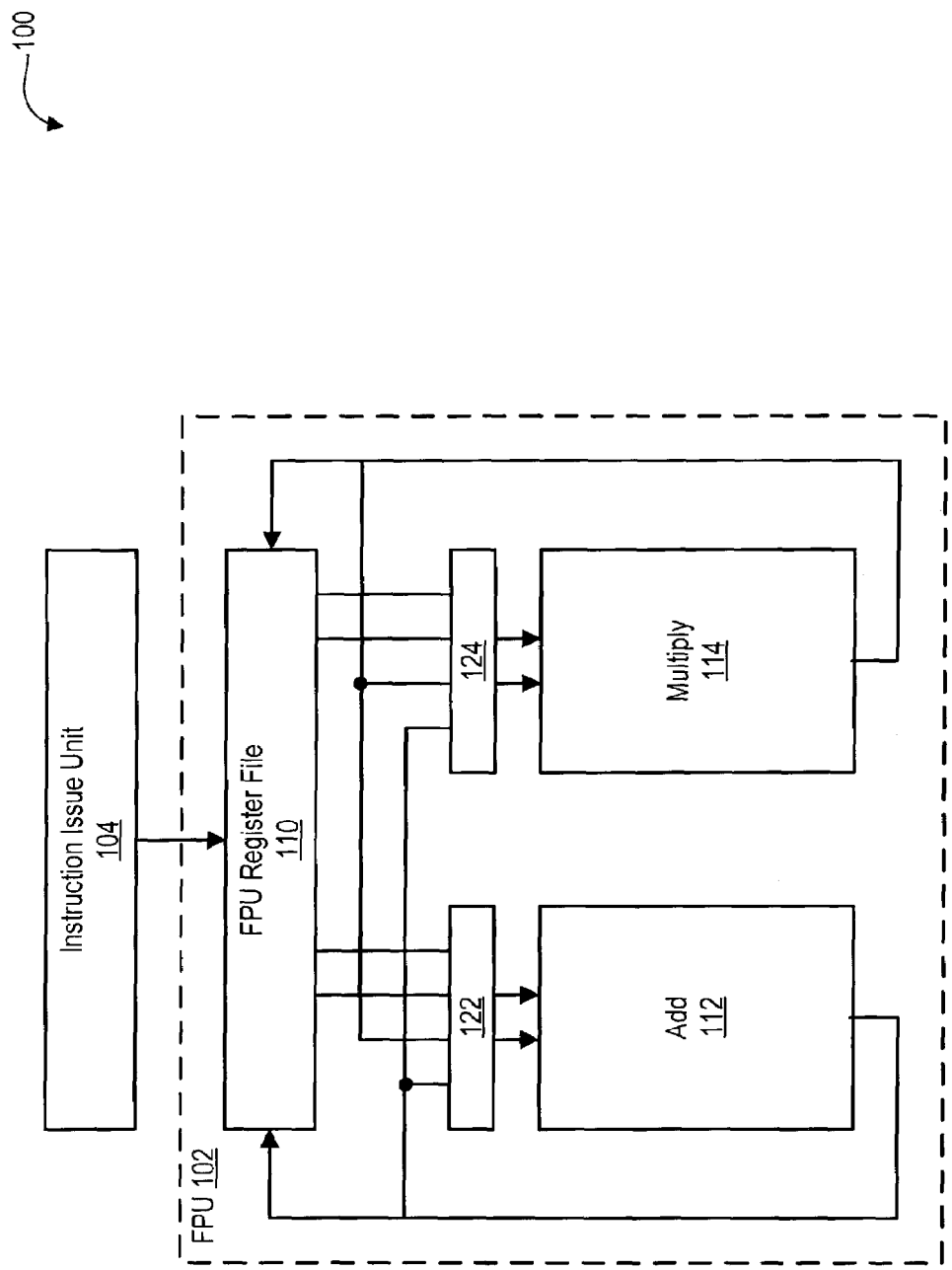
FIG. 1 shows a block diagram of a processor having a floating point execution unit including independent multiply and add pipelines.

Referring to FIG. 1, a block diagram of a processor 100 having a floating point execution unit 102 is shown. The processor 100 includes the floating point unit 102 as well as an instruction issue unit 104. It will be appreciated that the processor includes other functional units (not shown).

The floating point execution unit 102 includes a floating point unit register file 110 as well as a floating point add unit 112 and a floating point multiply unit 114. The floating point add unit 112 and the floating point multiply unit 114 each include respective multiplexers 122, 124.

Figure 2:
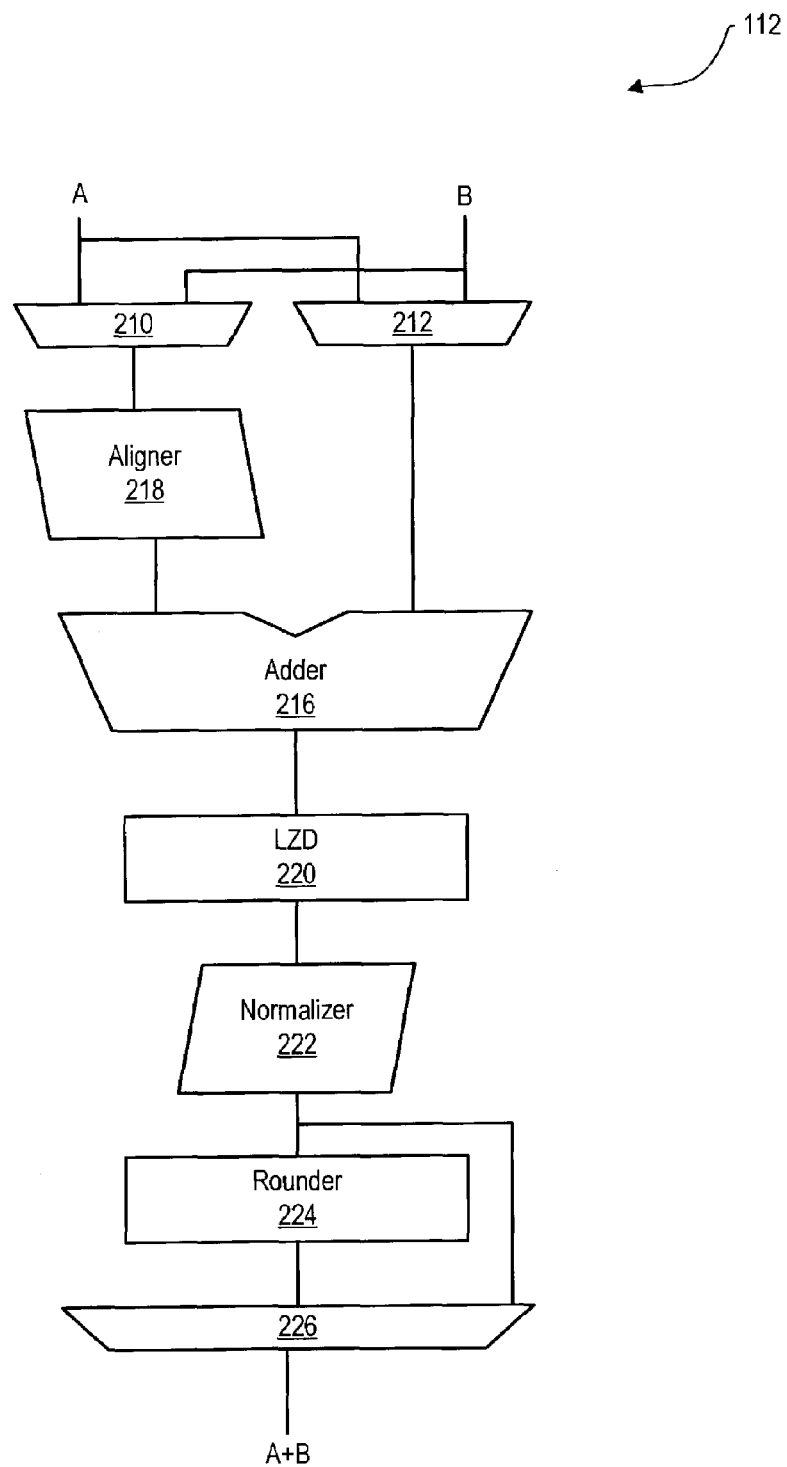
FIG. 2 shows a block diagram of an independent floating point add pipeline.

Referring to FIG. 2, a block diagram the pipeline of the independent floating point add unit 112 is shown. More specifically, the floating point add unit 112 includes multiplexers 210, 212 each of which receive sources A and B. The multiplexer 210 is coupled to the adder 216 via a two way aligner 218. The multiplexer 212 is also coupled directly to the adder 216. The adder 216 is coupled to a leading zero detector 220. The leading zero detector 220 is coupled to a two way normalizer 222. The two way normalizer 222 is coupled to a rounder 224 which is coupled to a multiplexer 226. The two way normalizer 222 is also directly coupled to the multiplexer 226.

Because the floating point add unit 112 includes a two way aligner 218 and a two way normalizer 222, the floating point unit may function in either a single instruction stream multiple data stream mode of operation or in a double precision mode of operation.

FIGS. 3A–3D shows diagrammatic representations of architected and internal data formats. More specifically, FIG. 3A shows a double precision (DP) 64-bit architected data format. FIG. 3B shows a single precision (SP) SIMD 64-bit architected data format. FIG. 3C shows a double precision 64-bit aligner output (0 bit shift) intermediate mantissa data format. FIG. 3D shows a single precision SIMD 64-bit aligner output (0 bit shift) intermediate mantissa data format.

Referring to FIG. 3A, the DP 64-bit architected data format includes a 52-bit fraction (FRAC) field (bits 0–51), a 11-bit exponent (EXP) field (bits 52–62) and a 1-bit sign (S) field. The exponent field represents the exponent value of the data. The sign field represents the sign of the data.

Referring to FIG. 3B, the SP SIMD 64-bit architected data format includes a 23-bit low fraction ($FRAC_L$) field (bits 0–22) a 9-bit low exponent ($EXP_L$) field (bits 23–30), a 1-bit low sign ($S_L$) field (bit 31), a 23-bit high fraction ($FRAC_H$) field (bits 32–54), a 9-bit high exponent field ($EXP_H$) field (bits 55–62), and a 1-bit high sign ($S_H$) field (bit 63).

Referring to FIG. 3C, the DP 64-bit aligner output (0 bit shift) intermediate mantissa data format includes an 11-bit zero (zero11) field, a 52-bit FRAC field and a 1-bit leading bit (L) field.

Referring to FIG. 3D the SP SIMD 64-bit aligner output (0 bit shift) intermediate mantissa data format includes an 8-bit low zero (zero8L) field (bits 0–7) a 23-bit low fraction ($FRAC_L$) field (bits 8–30), a 1-bit low leading bit (LL) field (bit 31), an 8-bit high zero (zero8H) field (bits 32–39), a 23-bit high fraction ($FRAC_H$) field (bits 40–62) and a 1-bit high leading bit ($L_H$) field (bit 63).

Figure 4:
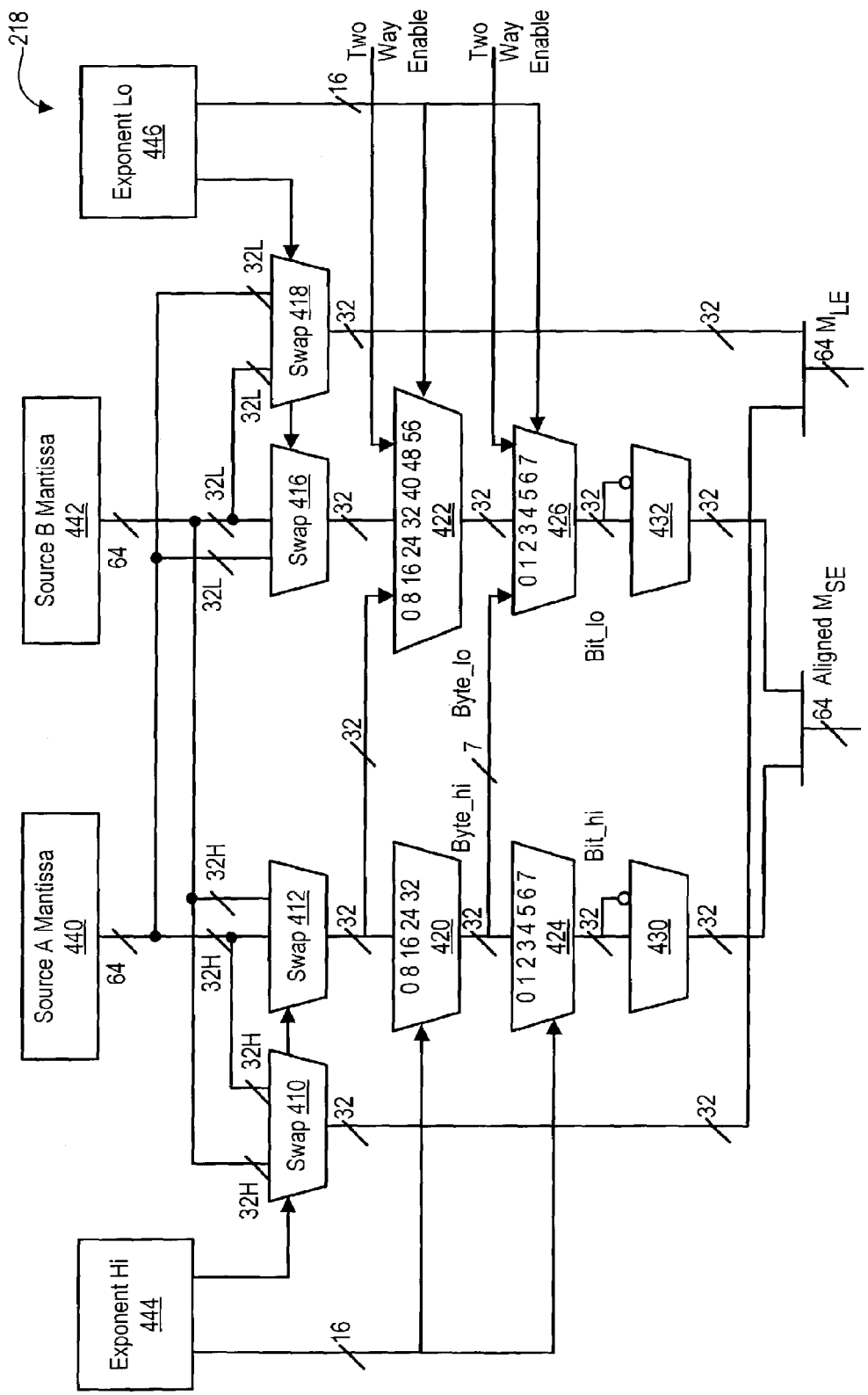
FIG. 4 shows a block diagram of a two way aligner.

Referring to FIG. 4, a block diagram of a two way aligner 218 in accordance with the present invention is shown. The aligner 218 includes swap multiplexers 410, 412, 416, and 418. The aligner 218 also includes high byte alignment shifter 420, low byte two way alignment shifter 422, high bit alignment shifter 424 and low bit two way alignment shifter 426. The aligner 218 also includes high inverter 430 and low inverter 432. The aligner 218 receives a source A mantissa 440 which is formatted, a source B mantissa 442 which is formatted as well as multiplexer selects from a high exponent block 444 and a low exponent block 446.

Swap multiplexer 410 receives the 32-bit high mantissa from source A and a 32-bit high mantissa from source B. Swap multiplexer 410 also receives a control bit from the high exponent. Swap multiplexer 410 provides a 32-bit output to provide the high portion of the 64-bit MLE value.

Swap multiplexer 412 receives the 32-bit high mantissa from source A and a 32-bit high mantissa from source B. Swap multiplexer 412 also receives a control bit from the high exponent. Swap multiplexer 412 provides a 32-bit output to high byte alignment shifter 420 as well as a 32-bit output to low byte two way alignment shifter 422.

High byte alignment shifter 420 also receives multiplexer selects from the exponent block 444. High byte shifter 420 provides a 32-bit output to high bit shifter 424. High byte shifter 420 also provides the seven less significant bits to low bit two way shifter 426.

High bit shifter 424 receives multiplexer selects from the exponent block 444 as well as the 32-bit output from high byte shifter 420. High bit shifter 424 provides the 32-bit shifted output to high inverter 430. High inverter 430 provides the high portion of the aligned mantissa with the smaller exponent ($M_{SE}$) value.

Swap multiplexer 416 receives the 32-bit low mantissa from source A and a 32-bit low mantissa from source B. Swap multiplexer 416 also receives a control bit from the low exponent. Swap multiplexer 416 provides a 32-bit output to low byte alignment shifter 422.

Swap multiplexer 418 receives the 32-bit low mantissa from source A and a 32-bit low mantissa from source B. Swap multiplexer 418 also receives a control bit from the low exponent. Swap multiplexer 418 provides a 32-bit output to provide the low portion of the 64-bit mantissa with the larger exponent ($M_{LE}$) value.

Low byte two way alignment shifter 422 also receives multiplexer selects from the exponent block 446. Low byte two way alignment shifter 422 also receives a two way enable signal. The two way enable signal controls whether the low byte two way alignment shifter 422 functions in a SIMD mode of operation or a double precision mode of operation. Low byte shifter 422 provides a 32-bit output to low bit shifter 426.

Low bit two way shifter 426 receives multiplexer selects from the exponent block 446 as well as the 32-bit output from low byte shifter 422. Low bit two way shifter also receives the seven less significant bits from high byte shifter 420. Low bit two way shifter also receives a two way enable signal. The two way enable signal controls whether the low bit two way alignment shifter 426 functions in a SIMD mode of operation or a double precision mode of operation. Low bit shifter 426 provides the 32-bit shifted output to low inverter 432. Low inverter 432 provides the low portion of the aligned $M_{SE}$ value.

In floating point arithmetic, when two numbers are added, the exponents must first be equal. To prepare for the addition in the adder 216, the operand mantissa with the smaller exponent ($M_{SE}$) is shifted in the aligner 218 to produce equal A and B exponents. The exponent logic 444, 446 computes the $M_{SE}$ alignment shift count (SC). SC is used to provide the select bit signals for each of the alignment shifter multiplexers 420, 424, 422, 426 (Bit and Byte). The alignment shifter multiplexers 420, 424, 422, 426 perform a right shift ranging from 0-bits to 53-bits (63-bits for convert to 64-bit integer instructions). A data forward path forwards the operand mantissa with the larger exponent (Mle) directly to the adder 216, bypassing the aligner 218 altogether.

With the two way aligner 218, independent add data paths use a swap mantissa alignment method to perform the alignment. More specifically, the operand mantissa with the smaller exponent (Mse) is aligned to the operand mantissa with the larger exponent (Mle). The Mse alignment shift count can be determined from the equation:

IF (Eb>=Ea)THEN(Sc=(Eb-Ea));ELSE(SC=(Ea-Eb))

Where:
Ea represents the biased exponent of operand A;
Eb represents the biased exponent of operand B; and,
Sc represents the alignment shift count The output of the aligner 218 is inverted when a logical subtract is to be performed. When a logical subtract occurs, Mse is inverted, never Mle. A logical subtract operation (also referred to as an effective subtract) is defined by the equation:

logical_subtract=(Sa XOR Sb)XOR Si

Where:
Sa=1 if operand A is negative, else Sa=0;
Sb=1 if operand B is negative, else Sb=0; and,
Si=1 if the instruction executing is a subtract, else Si=0.

Accordingly, two way aligner 218 may selectively function in a SIMD mode of operation or a double precision mode of operation.

Figure 5:
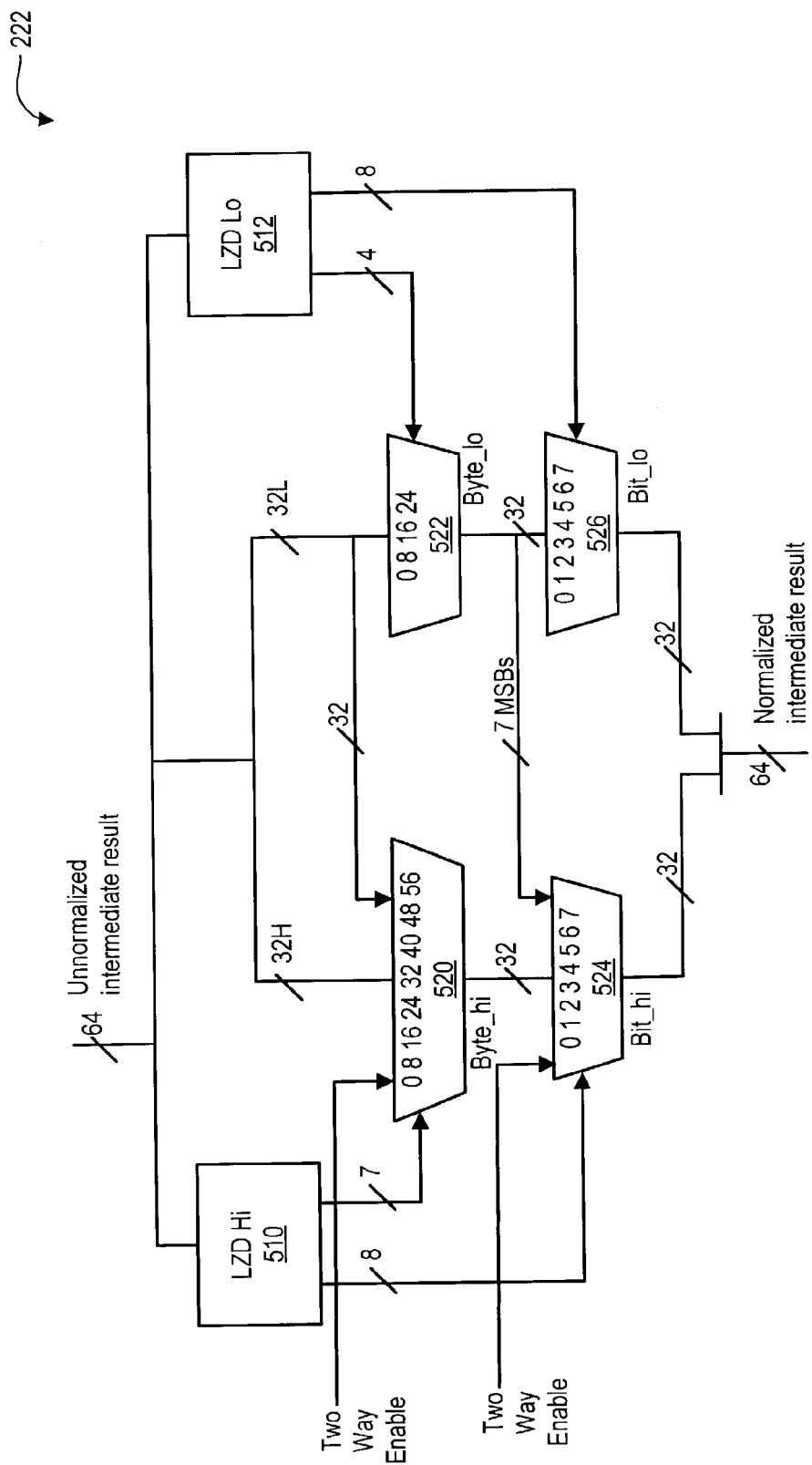
FIG. 5 shows a block diagram of a leading zero detector and a two way normalizer.

Referring to FIG. 5, a block diagram of the leading zero detector 220 and the two way normalizer 222 is shown. The leading zero detector 220 receives a 64-bit unnormalized intermediate result (see e.g., FIG. 3D) and the two way normalizer 222 provides a 64-bit normalized intermediate result. More specifically, leading zero detector 220 includes a high leading zero detector 510 and a low leading zero detector 512. Two way normalizer 222 also includes a high byte shifter 520 and a low byte shifter 522 as well as a high bit shifter 524 and a low bit shifter 526.

Leading zero detector 220 and normalizer 222 receive a 64-bit unnormalized intermediate result. The 32 more significant bits are provided to the high LZD 510 as well as to the high byte two way shifter 520. The 32 less significant bits are provided to the low LZD 512 as well as to the low byte shifter 522. The 32 less significant bits are also provided to the high byte two way shifter 520. High byte two way shifter 520 also receives a two way enable signal.

High byte shifter 520 provides the 32-bit shifted value to a high bit two way shifter 524. Low byte shifter 522 provides the 32-bit low shifted value to bit low shifter 526. Byte low shifter 522 also provides the seven more significant bits of the low value to the high bit two way shifter 524. High bit two way shifter also receives the two way enable signal.

High bit two way shifter 524 provides the 32 more significant bits of the normalized intermediate result. Low bit shifter 526 provides the 32 less significant bits of the normalized intermediate result.

Normalizer 222 performs a post-normalization function by shifting the mantissa left while decrementing the exponent for each bit shifted until the leading mantissa bit (i.e., the first bit to the left of the binary point) becomes a one. The normalizer 222 performs a left shift of 0-bits to 52-bits (63-bits for 64-bit integer to floating point conversion instructions) on the 64-bit unnormalized intermediate result to obtain a normalized intermediate result.

Additionally, normalizer 222 may selectively function in a SIMD mode of operation or a double precision mode of operation.

Conventional floating point add pipelines perform normalization only for logical subtract operations. Normalization is not performed on logical add operations because the unnormalized intermediate mantissa result is in the format 01.XX or 1X.XX, assuming pre-normalized operands. For a given operations, the leading zero anticipator (LZA) and/or leading zero detector (LZD) circuit finds the leading one (find one), or finds the leading zero (find zero) to properly produce shift control signals for the normalizer. The find zero case is used when the exponent of the A operand (Ea) is equal to the exponent of the B operand (Eb) and the mantissa which was assumed to be the smaller of the two operands is actually the larger of the two operands. This situation is detected when there is no carry out from the adder after performing the logical subtract operation (invert_adder=1).

invert_adder=(logical_subtract & !cout)

The find one case is used when there is a carry out from the adder after performing the logical subtract operation (invert_adder=0). An example of a logical subtract operation which requires normalization is set forth as follows. Assume that Ea>Eb and that the B operand has been aligned accordingly.

10000000 A
01111111 B aligned
00000001 (A−B) unnormalized
10000000 (A−B) normalized, 7-bit left shift The normalizer 222 uses a LZD circuit to generate the shift control signals for the normalizer 222. More specifically, the high LZD 510 generates shift control signals for the high normalizer byte shifter 520 and the high normalizer bit shifter 524. The low LZD 512 generates shift control signals for the low normalizer byte shifter 522 and the low normalizer bit shifter 526. Because the LZDs 510 and 512 observe the sign-magnitude output from the adder 216, the LZDs 510 and 512 only handle the find one case, and not the find zero case.

Figure 6:
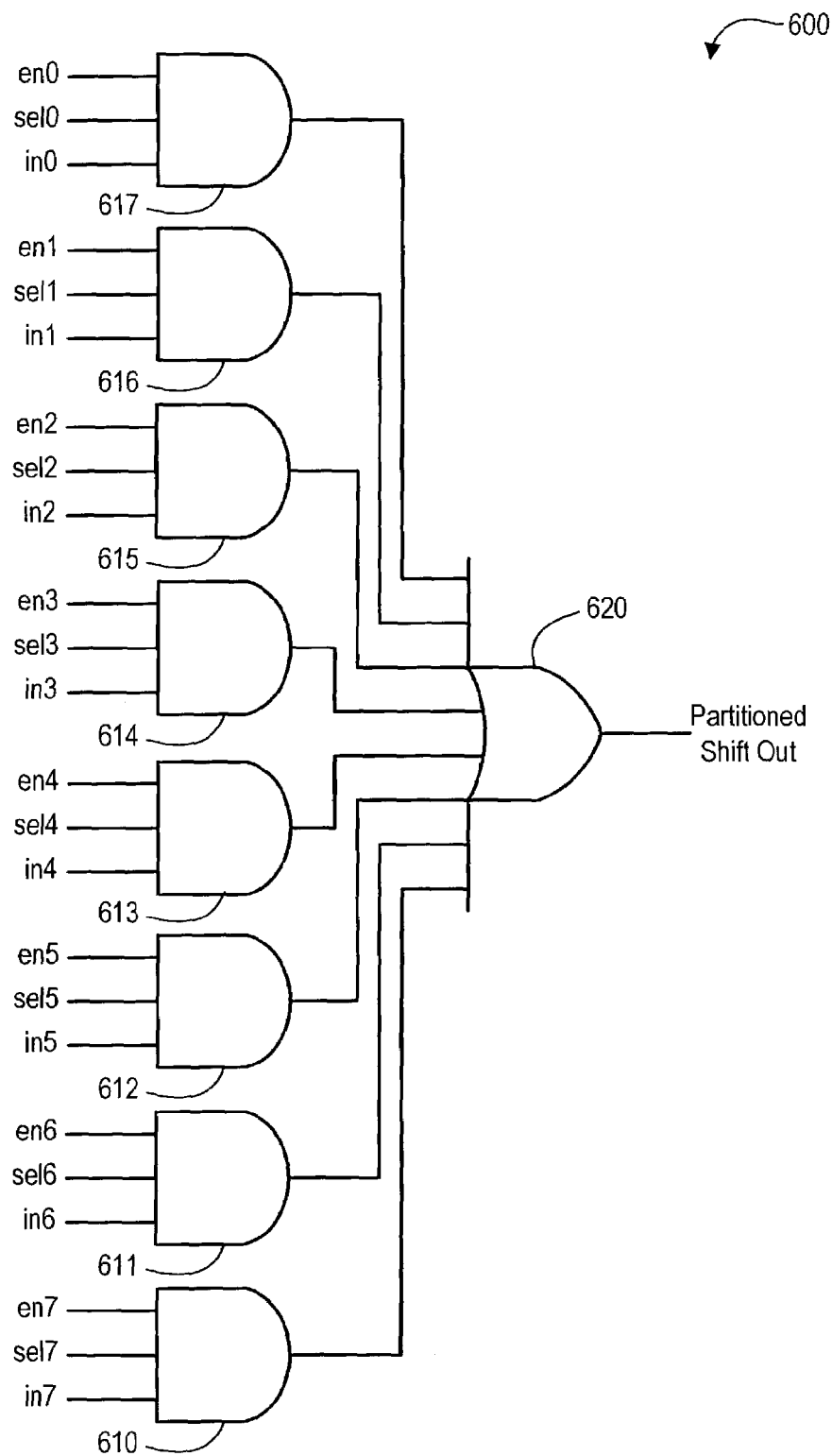
FIG. 6 shows a schematic block diagram of a partitioned shift multiplexer.

Referring to FIG. 6, a schematic block diagram of a multiplexer 600 which enables a partitioned shift. Enabling a partition shift allows the floating point add unit to function in either a SIMD mode of operation or a double precision mode of operation. Multiplexer 422, multiplexer 426, multiplexer 520 and multiplexer 524 function as partitioned shift multiplexers. The partitioned shift multiplexer 600 is configured as an AND-OR 8:1 multiplexer which enables a partitioned shift.

More specifically, multiplexer 600 includes AND gates 610, 611, 612, 613, 614, 615, 616, and 617 which each provide a respective output to OR gate 620. Each AND gate 610–617 receives a respective bit of an enable signal (en0–en7), a select signal (sel0–sel7) and a data input signal (in0–in7). The partitioned shift multiplexer 600 provides a partitioned shift output signal. By providing the partitioned shift multiplexer 600 with the enable bits in addition to the select and data input bits, the partitioned shift multiplexer provides a partitioned shift output signal.

Other Embodiments

Other embodiments are within the following claims.

For example, while the embodiment sets forth particular bit widths for signals, it will be appreciated that other bits widths may be used.

Also for example, while the multiplexer 600 is shown as an AND OR combination, other gate combinations which provide multiplexer functionality, such as a pass gate multiplexer configuration, may be used.

What is claimed is:

1. A method of enabling a single instruction stream multiple data stream operation and a double precision floating point operation within a single floating point execution unit comprising:
   providing a floating point unit with a two way aligner and a two way normalizer;
   selectively aligning a value based upon whether a single instruction stream multiple data stream operation is to be performed or a double precision operation is to be performed; and,
   selectively normalizing a value based upon whether a single instruction stream multiple data stream operation is to be performed or a double precision operation is to be performed.

2. The method of claim 1, wherein:
   the floating point unit includes a floating point add unit.

3. The method of claim 1, wherein:
   the selectively aligning is performed via a partitioned shift operation.

4. The method of claim 1, wherein:
   the selectively normalizing is performed via a partitioned shift operation.

5. A floating point add unit for performing a single instruction stream multiple data stream operation and a double precision floating point operation comprising:
   a first multiplexer;
   a second multiplexer;
   a two way aligner coupled to the first multiplexer, the two way aligner including a partitioned shift multiplexer, the partitioned shift multiplexer selectively aligning a value based upon whether a single instruction stream multiple data stream operation is to be performed or a double precision operation is to be performed;
   an adder coupled to the two way aligner and to the second multiplexer;
   a leading zero detector coupled to the adder;
   a two way normalizer coupled to the leading zero detector, the two way normalizer including a partitioned shift multiplexer, the partitioned shift multiplexer selectively normalizing a value based upon whether a single instruction stream multiple data stream operation is to be performed or a double precision operation is to be performed;
   a rounder coupled to the two way normalizer; and,
   a multiplexer coupled to the two way normalizer and to the rounder.

6. The floating point add unit of claim 5, wherein:
   the selectively aligning is performed via a partitioned shift operation.

7. The floating point add unit of claim 5, wherein:
   the selectively normalizing is performed via a partitioned shift operation.

8. The floating point add unit of claim 5, wherein:
   the partitioned shift multiplexer of the two way aligner includes a high byte alignment shifter and a high bit alignment shifter.

9. The floating point add unit of claim 8, wherein:
   the partitioned shift multiplexer of the two way aligner includes a low byte two way alignment shifter and a low bit two way alignment shifter, the low byte two way alignment shifter and the low bit two way alignment shifter selectively aligning a value based upon whether a single instruction stream multiple data stream operation is to be performed or a double precision operation is to be performed.

10. The floating point add unit of claim 5, wherein:
    the partitioned shift multiplexer of the two way normalizer includes a low byte shifter and a low bit shifter.

11. The floating point add unit of claim 10, wherein:
    the partitioned shift multiplexer of the two way normalizer includes a high byte two way shifter and a high bit two way shifter, the high byte two way shifter and the high bit two way shifter selectively normalizing a value based upon whether a single instruction stream multiple data stream operation is to be performed or a double precision operation is to be performed.

12. The floating point add unit of claim 5, wherein:
    the partitioned shift multiplexer of the two way aligner includes a high byte alignment shifter, a high bit alignment shifter, a low byte two way alignment shifter and a low bit two way alignment shifter, the low byte two way alignment shifter and the low bit two way alignment shifter selectively aligning a value based upon whether a single instruction stream multiple data stream operation is to be performed or a double precision operation is to be performed; and,
    the partitioned shift multiplexer of the two way normalizer includes a low byte shifter, a low bit shifter, the partitioned shift multiplexer of the two way normalizer includes a high byte two way shifter and a high bit two way shifter, the high byte two way shifter and the high bit two way shifter selectively normalizing a value based upon whether a single instruction stream multiple data stream operation is to be performed or a double precision operation is to be performed.

13. A floating point unit for performing a single instruction stream multiple data stream operation and a double precision floating point operation comprising:
    a first multiplexer;
    a second multiplexer;
    a two way aligner coupled to the first multiplexer, the two way aligner including a partitioned shift multiplexer, the partitioned shift multiplexer selectively aligning a value based upon whether a single instruction stream multiple data stream operation is to be performed or a double precision operation is to be performed;
    an adder coupled to the two way aligner and to the second multiplexer;

a leading zero detector coupled to the adder;

a two way normalizer coupled to the leading zero detector, the two way normalizer including a partitioned shift multiplexer, the partitioned shift multiplexer selectively normalizing a value based upon whether a single instruction stream multiple data stream operation is to be performed or a double precision operation is to be performed;

a rounder coupled to the two way normalizer; and, a multiplexer coupled to the two way normalizer and to the rounder.

14. The floating point unit of claim 13, wherein:

the selectively aligning is performed via a partitioned shift operation.

15. The floating point unit of claim 13, wherein:

the selectively normalizing is performed via a partitioned shift operation.

16. The floating point unit of claim 13, wherein:

the partitioned shift multiplexer of the two way aligner includes a high byte alignment shifter and a high bit alignment shifter.

17. The floating point unit of claim 16, wherein:

the partitioned shift multiplexer of the two way aligner includes a low byte two way alignment shifter and a low bit two way alignment shifter, the low byte two way alignment shifter and the low bit two way alignment shifter selectively aligning a value based upon whether a single instruction stream multiple data stream operation is to be performed or a double precision operation is to be performed.

18. The floating point unit of claim 13, wherein:

the partitioned shift multiplexer of the two way normalizer includes a low byte shifter and a low bit shifter.

19. The floating point unit of claim 18, wherein:

the partitioned shift multiplexer of the two way normalizer includes a high byte two way shifter and a high bit two way shifter, the high byte two way shifter and the high bit two way shifter selectively normalizing a value based upon whether a single instruction stream multiple data stream operation is to be performed or a double precision operation is to be performed.

20. The floating point unit of claim 13, wherein:

the partitioned shift multiplexer of the two way aligner includes a high byte alignment shifter, a high bit alignment shifter, a low byte two way alignment shifter and a low bit two way alignment shifter, the low byte two way alignment shifter and the low bit two way alignment shifter selectively aligning a value based upon whether a single instruction stream multiple data stream operation is to be performed or a double precision operation is to be performed; and, the partitioned shift multiplexer of the two way normalizer includes a low byte shifter, a low bit shifter, the partitioned shift multiplexer of the two way normalizer includes a high byte two way shifter and a high bit two way shifter, the high byte two way shifter and the high bit two way shifter selectively normalizing a value based upon whether a single instruction stream multiple data stream operation is to be performed or a double precision operation is to be performed.

* * * * *